United States Patent
Zhang

(10) Patent No.: US 12,177,059 B1
(45) Date of Patent: Dec. 24, 2024

(54) ESTIMATING TRANSMITTER SKEW

(71) Applicant: Acacia Communications, Inc., Maynard, MA (US)

(72) Inventor: Hongbin Zhang, Holmdel, NJ (US)

(73) Assignee: ACACIA COMMUNICATIONS, INC., Maynard, MA (US)

( * ) Notice: Subject to any disclaimer, the term of this patent is extended or adjusted under 35 U.S.C. 154(b) by 0 days.

(21) Appl. No.: 18/529,307

(22) Filed: Dec. 5, 2023

Related U.S. Application Data

(63) Continuation of application No. 16/547,716, filed on Aug. 22, 2019, now abandoned, which is a continuation of application No. 15/719,927, filed on Sep. 29, 2017, now abandoned.

(60) Provisional application No. 62/402,998, filed on Sep. 30, 2016.

(51) Int. Cl.
  *H04L 27/36* (2006.01)
  *H04L 7/00* (2006.01)
  *H04L 7/04* (2006.01)

(52) U.S. Cl.
  CPC .......... *H04L 27/364* (2013.01); *H04L 7/0091* (2013.01); *H04L 27/366* (2013.01); *H04L 7/042* (2013.01)

(58) Field of Classification Search
  CPC . H04L 27/364; H04L 27/3863; H04L 7/0029; H04L 27/2647; H04L 7/027; H03D 3/009
  USPC ........................................................ 375/296
  See application file for complete search history.

(56) References Cited

U.S. PATENT DOCUMENTS

| | | |
|---|---|---|
| 2005/0147194 A1 | 7/2005 | Koenenkamp |
| 2007/0047683 A1 | 3/2007 | Okamura |
| 2009/0092193 A1 | 4/2009 | Fujita |
| 2009/0289672 A1 | 11/2009 | Hua |
| 2009/0296867 A1 | 12/2009 | Do |
| 2011/0063150 A1 | 3/2011 | Katayama |
| 2012/0213510 A1* | 8/2012 | Stojanovic ......... H04B 10/6165 398/25 |
| 2013/0259153 A1* | 10/2013 | Varanese ............. H04L 27/3872 375/295 |

OTHER PUBLICATIONS

Petrou et al., Quadrature Imbalance Compensation for PDM QPSK Coherent Optical Systems, IEEE Photonics Technology Letters (Dec. 2009), 21(24):1876-1878.

Rios-Muller et al., Blind Receiver Skew Compensation for Long-Haul Non-Dispersion Managed Systems, in Proc. ECOC 2014, Th.2.3.1., Cannes, France.

Valkama et al., Advanced Methods for I/Q Imbalance Compensation in Communication Receivers, IEEE Transactions on Signal Processing (Oct. 2001), 49(10):2335-2344.

(Continued)

*Primary Examiner* — Leila Malek
(74) *Attorney, Agent, or Firm* — K&L Gates LLP

(57) ABSTRACT

A method, apparatus, and computer program product for estimated transmit skew comprising restoring an I component and a Q component of a signal, extracting clock information from the I component, extracting clock information from the Q component, and determining the skew between the I component and the Q component using the extracted clock information from the I component and the extracted clock information from the Q component.

19 Claims, 14 Drawing Sheets

(56) References Cited

OTHER PUBLICATIONS

Stojanovic et al., An Efficient Method for Skew Estimation and Compensation in Coherent Receivers, IEEE Photonics Technology Letters (Feb. 2016), 28(4):489-492.

Yue et al., Detection and Alignment of Dual-Polarization Optical Quadrature Amplitude Transmitter IQ and XY Skews Using Reconfigurable Interference, Optics Express (2016), vol. 2.

Mueller et al., Time Recovery in Digital Synchronous Data Receivers, IEEE Transactions on Communications (May 1976), 24(5):516-531.

* cited by examiner

US 12,177,059 B1

ESTIMATING TRANSMITTER SKEW

CROSS REFERENCE TO RELATED APPLICATIONS AND PRIORITY CLAIM

This application is a Continuation application claiming priority under 35 U.S.C. § 120 to U.S. patent application Ser. No. 16/547,716, entitled "ESTIMATING TRANSMITTER SKEW," filed Aug. 22, 2019, which is a continuation application claiming priority to U.S. patent application Ser. No. 15/719,927, filed Sep. 29, 2017 entitled "ESTIMATING TRANSMITTER SKEW," which claims the benefit of U.S. Provisional Patent Application No. 62/402,998 filed Sep. 30, 2016, entitled "AN EFFICIENT METHOD FOR TRANSMITTER SKEW ESTIMATION IN COHERENT RECEIVERS," filed on Sep. 30, 2016, the entire disclosures of which are hereby incorporated by reference herein.

BACKGROUND

Communication systems generally transmit a signal from a transmitter to a receiver. Typically, if there are differences between the signal that was meant to be transmitted and the signal that is received, there may be complications in decoding information in the signal.

SUMMARY

A method, apparatus, and computer program product for estimating transmit skew comprising restoring an in-phase (I) component and a quadrature (Q) component of a signal, extracting clock information from the I component, extracting clock information from the Q component, and determining the skew between the I component and the Q component using the extracted clock information from the I component and the extracted clock information from the Q component.

DETAILED DESCRIPTION

Figure 1C:
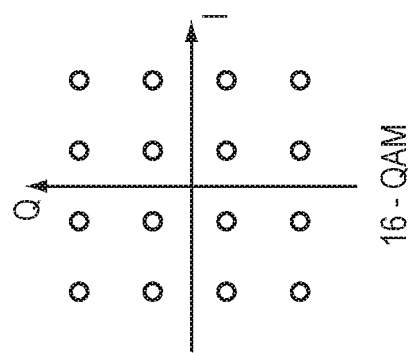
FIG. 1c is a simplified illustration of 16 QAM encoded on I/Q resulting in a plot of 16 constellation points, in accordance with an embodiment of the present disclosure.

In some embodiments, there may be degradation in transmission systems that use in-phase and quadrature (I/Q) when there is a misalignment or skew between I and Q components. In certain embodiments, skew may refer to a time difference between an I component and a Q component of a signal. In many embodiments, skew or misalignment of the I/Q components of the signal may occur on both transmitter (Tx) and receiver (Rx) sides. In many embodiments, the current disclosure may enable calculation of I/Q skew by recovering clock information in a transmitted signal and using the difference in the I component clock information and the Q component clock information to determine the I/Q skew.

In many embodiments, a transmission system may include a transmitter and a receiver. In most embodiments, a transmission, such as a set of bits, may be encoded in a signal at a transmitter. In most embodiments, a transmitter may transmit an encoded signal to a receiver. In certain embodiments, a receiver may receive a signal from a transmitter and decode the signal into information. In almost all embodiments, there are number of conditions that can impact the signal which may make it hard to decode the information. In certain embodiments, a signal may be transmitted over an RF connection. In other embodiments, a signal may be transmitted over an optical link.

In certain embodiments, degradation of performance may occur when in-phase and quadrature (I/Q) components of the signal have misalignments in terms of amplitude, phase, and time delay. In particular embodiments, degradation may take place in wireless or Radio Frequency (RF) systems. In other embodiments, this degradation may take place in optical systems.

Conventionally, estimation and compensation of misalignment of I/Q that is added on an Rx side is relatively easy. Typically, gain and phase mismatches in Mach-Zehnder modulators may be minimized by a well-designed control loop. In some embodiments, on a Tx side, different delay (i.e. skew) in electrical paths to the modulator may be calibrated by monitoring bit error rate (BER) performance while sweeping the skew of programmed I/Q waveforms inside a digital analog converter (DAC) or may be calculated by measuring the power of the interference with identical electrical inputs into the modulator; however these methods are not usually able to be applied in real-time transmission. Conventionally, today's techniques for measuring skew may not be performed in real time. Generally, conventional techniques are not able to use real data to estimate skew and typically need to use a particular set of training data. In many embodiments, the current disclosure may enable an efficient method to estimate the Tx skew from the real-time received data. In most embodiment, the current disclosure may enable an efficient method to estimate the Tx skew from the real-time after deployment of a transmitter and receiver. In most embodiment, the current disclosure may enable correction of Tx skew from the real-time after deployment of a transmitter and receiver.

In some embodiments, degrading performance may occur for wireless receivers when in-phase and quadrature (I/Q) components of the signal have misalignments in terms of amplitude, phase, and time delay. In certain embodiments, degrading of performance of coherent receivers may occur when in-phase and quadrature (I/Q) components of the signal have misalignments in terms of amplitude, phase, and time delay. In many embodiments, degradation due to I/Q misalignment may impact higher-capacity communications employing higher symbol rate and higher order modulation format. In most embodiments, skew on a Tx side may be static and once skew is estimated and corrected, further corrections to skew may not be necessary. In other embodiments, skew may be dynamic and may need to be estimated and recalibrated.

In certain embodiments, it may be possible to estimate and correct Tx skew after a signal producer, such as an optical modulator is produced. In other embodiments, where the signal producer or optical modulator is a component of a product or card, it may not be possible to correct for signal skew until the component is installed in the card or product. In certain embodiments, when an optical modulator is integrated with other components, the other components, often due to the delay of electronic components, may introduce skew into the overall system. In embodiments where the signal producer or optical modulator is incorporated into a product, signal skew and the ability to correct for it may be challenging for a system integrator. In most embodiments, one or more of the current techniques may enable estimation and correction of signal skew regardless of whether the signal producer is part of a card or product or is the card or product itself. In many embodiments, a DSP and optical modulator may be coupled via an electrical interface on a board. In most embodiments, the combination of the components may create complexity in estimating I/Q skew as the board, optical modulator, and DSP may all inject skew into the I/Q signal. In most embodiments, it may be necessary to calculate skew real time once the components of a board or card have been integrated.

Figure 1B:
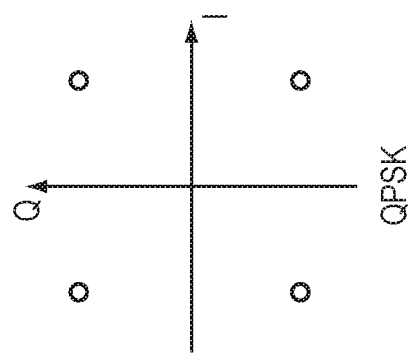
FIG. 1b is a simplified illustration of QPSK encoded on I/Q resulting in a plot of 4 constellation points, in accordance with an embodiment of the present disclosure.
Figure 1A:
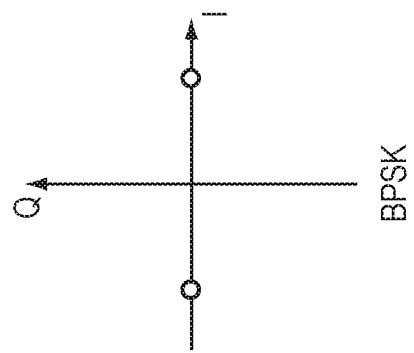
FIG. 1a is a simplified illustration a BPSK signal is encoded on I/Q which results in a plot of 2 dots, in accordance with an embodiment of the present disclosure.

Refer now to the example embodiments of FIGS. 1a, 1b, and 1c, which show example encoding using I/Q as represented in constellations. In FIG. 1a, a BPSK signal is encoded on I/Q which results in a plot of 2 dots. In FIG. 1b, QPSK is encoded on I/Q resulting in a plot of 4 constellation points. In FIG. 1C 16 QAM is encoded on I/Q resulting in a plot of 16 constellation points.

Figure 2A:
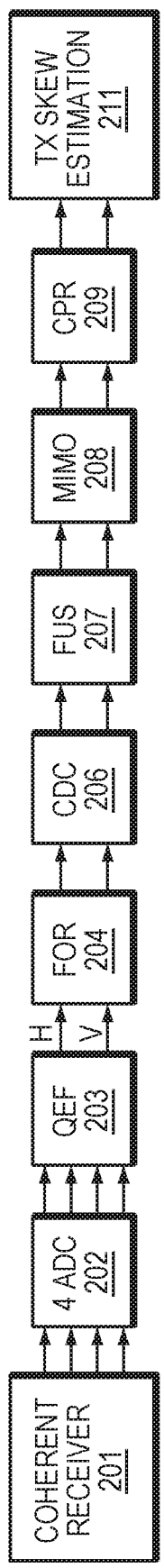
FIG. 2a is a simplified illustration of DSP function blocks, in accordance with an embodiment of the present disclosure.

Refer now to the example embodiment of FIG. 2a, which illustrates a DSP function blocks. At coherent receiver 201, the waveforms from the optical hybrid output of coherent receiver 201 are sampled using four-channel ADC converters 202. Quadrature error filter block 203 provides IQ swapping, amplitude adjustment, and time delay adjustment in the receiver side. Frequency Offset Removal 204 compensates for a frequency offset, which may have been introduced in a local oscillation verses the transmit oscillator. Chromatic Dispersion Correction block 206 corrects chromatic dispersion. Flexible up-sample block 207 resamples the data. In certain embodiments, the data may be resampled to be 2 times the data baud rate. Referring back to FIG. 2a, multiple input multiple output adaptive linear equalizer 207 functions as polarization demultiplexer and equalizes the impairment like polarization mode dispersion from communication channel. Carrier Phase Recovery block 209 recovers the carrier phase. In this embodiments, a digital signal processor (DSP) as shown in the blocks 1010-1035, compensates the frequency offset, chromatic dispersion, and re-samples the waveform with the recovered clock. Polarization demultiplexing and channel equalization are carried out by adaptive MIMO filters in MIMO 208. Tx skew is estimated in Tx Skew Estimation 211. In most embodiments, a resulting signal after carrier phase recovery without phase ambiguity using pilot symbols can be used to estimate the Tx skew as described herein. In many embodiments, a pilot symbol may be a symbol with known information. In certain embodiments, a pilot symbol may be used for control equalization, synchronization, or references purposes.

Figure 2B:
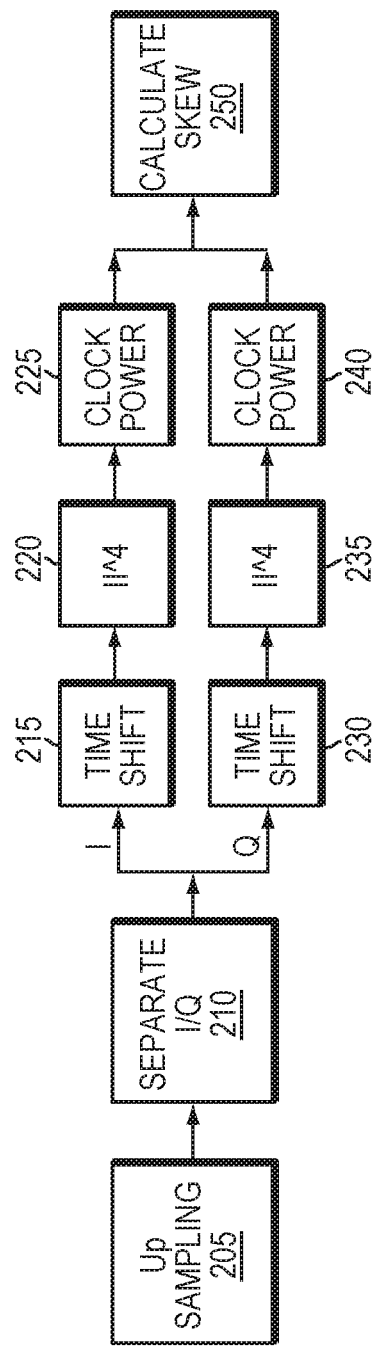
FIG. 2b is a simplified illustration of a method for Tx skew estimation, in accordance with an embodiment of the present disclosure.

Refer now to the example embodiment of FIG. 2b. FIG. 2b represents a method for Tx skew estimation. The signal after carrier phase recovery (CPR) block in the DSP receiver is resampled at two samples per symbol (step 205). It shall be noted that both polarizations and in-phase/quadrature components of the signal after CPR align with the signal at the transmitter. This is because the pilot symbols in absolute phase detection removes the phase ambiguity. The real and imaginary parts of the signal after CPR are then separated into I and Q components (step 210). The I component of the resampled signal is time shifted with a small step size (e.g. 0.1 ps) (step 215). A fourth power of the time shifted I component is calculated (Step 220). The clock power is estimated (step 225). The Q component of the resampled signal is time shifted with a small step size (e.g. 0.1 ps) (step 230). A fourth power of the time shifted Q component is calculated (Step 235). The clock power of the time shifted Q is calculated (step 240). The skew of the I/Q components is calculated based on the difference of the time shift at which the clock power is minimized. (step 250). In most embodiments, once the skew of an I/Q signal has been calculated, the skew may be corrected by shifting the I or Q waveform inside the DSP in the opposite direction.

Figure 2D:
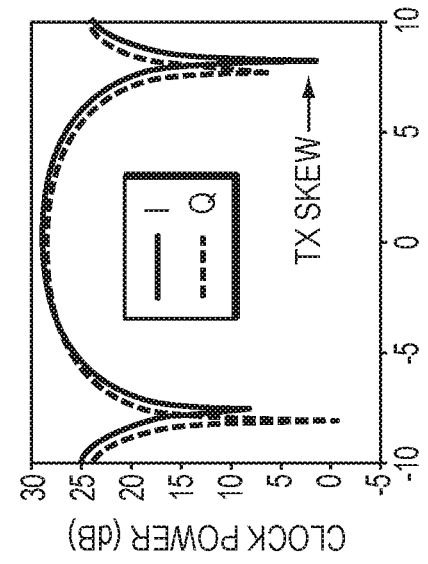
FIG. 2d is a simplified illustration of Tx skew estimated as the difference of time shift between in-phase and quadrature components from received constellation data, in accordance with an embodiment of the present disclosure.
Figure 2C:
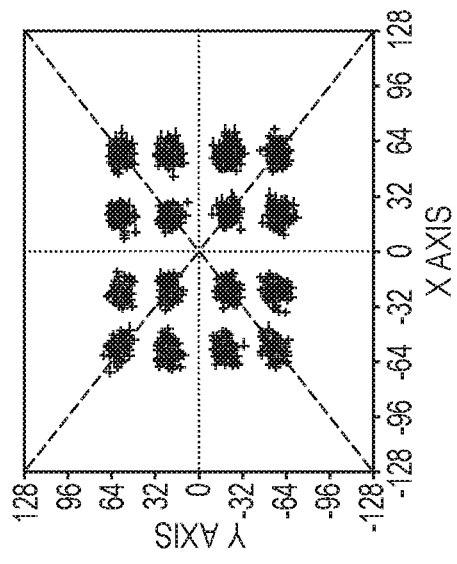
FIG. 2c is a simplified illustration of a 16QAM constellation after a CPR block, in accordance with an embodiment of the present disclosure.

Refer now as well to the examples embodiments of FIGS. 2c and 2d. FIG. 2c shows the 16QAM constellation after CPR block. The I/Q components of the constellation points are projected into the real and imaginary axis of the constellation. FIG. 2d represents the Tx skew estimated as the difference of time shift between in-phase and quadrature components from received constellation data. In FIG. 2d, the Tx skew causes different time shift which leads to the minimum clock power at the symbol frequency.

In most embodiments, as increasing amounts of data are encoded into a signal, such as that of FIG. 1c, eliminating skew may become increasingly important at higher-order constellation.

In some embodiments, if individual clock information is extracted from the in-phase and quadrature components, then the Tx skew may be estimated by the phase difference between them:

$$Tx\ skew = \frac{T_s}{2\pi}(\text{Phase}(I) - \text{Phase}(Q))$$

where $T_s$ is the symbol period.

In certain embodiments, if a signal has one sample per symbol, a Mueller and Muller (M&M) algorithm may be used to estimate the clock phase of both in-phase and quadrature components separately. In many embodiments, for a real input sequence x(n) sampled at one samples per symbol, the digital Mueller and Mueller phase detector may be shown as $$\text{Phase error }(x) = \sum_{n=0}^{\frac{N}{2}-1}[x(n)\hat{x}(n-1) - \hat{x}(n)x(n-1)]$$

Where $\hat{x}(n)$ is the symbol decision of x(n). For QPSK signal, the estimated TX skew based on M&M phase detector is a monotonic function of skew within $[-T_s/4, T_s/4]$. In many embodiments, for higher-order modulation formats, the probability of symbol decision error is high even with a small skew. In certain embodiments, the useful measurement range without ambiguity may decrease.

Figure 3B:
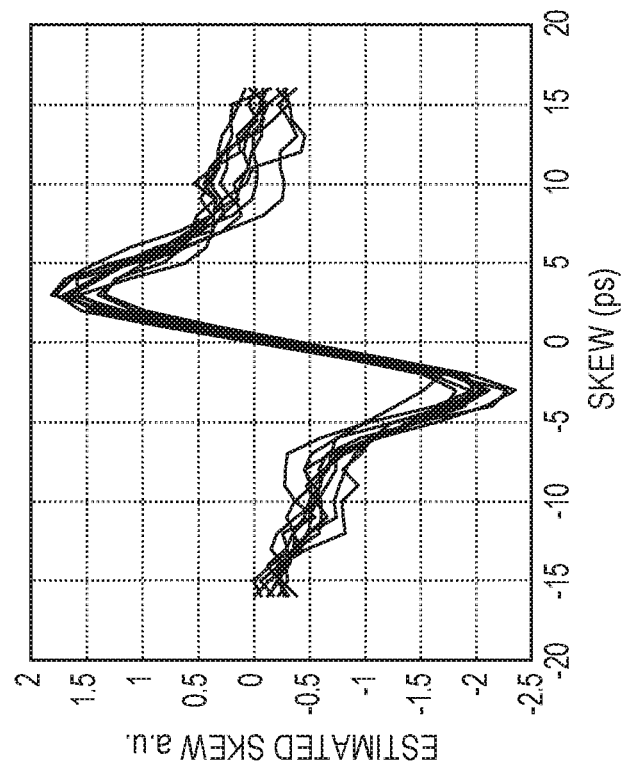
FIG. 3b is a simplified illustration of a skew estimate based for a 16 QAM signal, in accordance with an embodiment of the present disclosure.
Figure 3A:
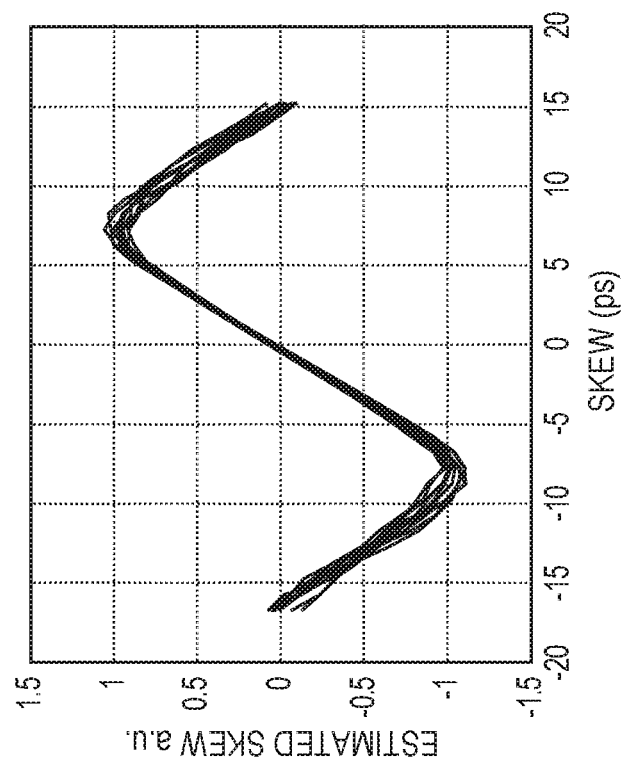
FIG. 3a is a simplified illustration of a skew estimate for a QPSK signal, in accordance with an embodiment of the present disclosure.

In certain embodiments, to solve a problem of the useful measurement range decreasing, a non-decision aided (NDA) method, may be used to estimate the time offset between I/Q components in the transmitter side for modulation formats. Refer now to the example embodiments of FIGS. 3a and 3b. In the example embodiment of FIG. 3a, a skew estimate based on M&M for a QPSK signal ($T_s$=32 ps) is graphically illustrated using the method of FIG. 2a. In the example embodiment of FIG. 3b, a skew estimate based on M&M for a 16 QAM signal ($T_s$=32 ps) is graphically illustrated using the method of FIG. 2a.

In many embodiments, a return-to-zero (RZ) signal may describe a line code used in signals in which the signal drops (returns) to zero between each pulse or transmission. In certain embodiments, a non-return to zero (NRZ) may be a signal or code where ones may be represented by a condition, such as a positive voltage or value and were zeros may be represented by a condition, such as a negative voltage or value, where the signal may not have a neutral or rest condition between information transferred. In some embodiments, a frequency spectra of a return-zero (RZ) signal with binary on-off key (OOK) may have a strong clock at the symbol rate as illustrated by $$\Phi(f) = \frac{P}{2}(1 + \frac{1}{T_s}\sum_{n=-\infty}^{\infty}\delta(f - \frac{n}{T_s}))$$

Where $T_s$ is the symbol period.

Figure 4A:
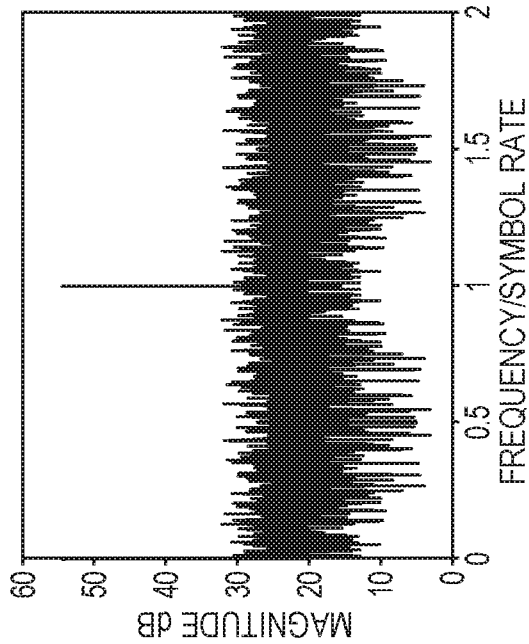
FIG. 4a is a simplified illustration of a RZ-OOK signal digitized at a ×2 sampling ratio, in accordance with an embodiment of the present disclosure.
Figure 4B:
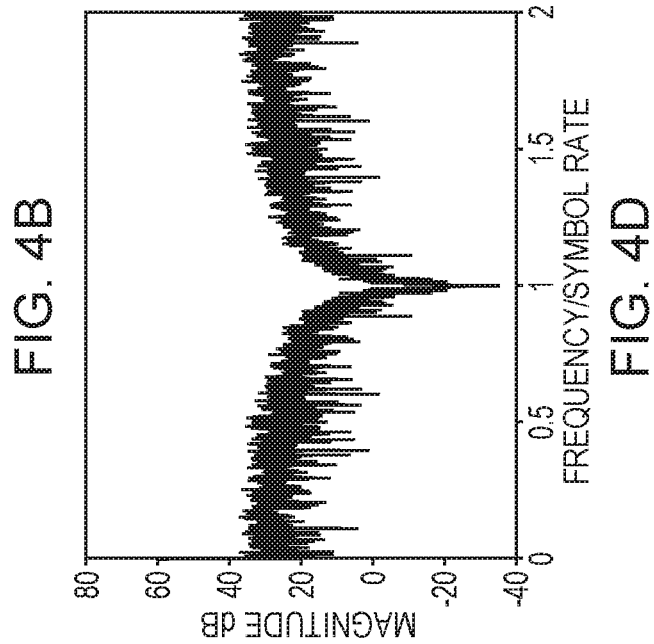
FIG. 4b is a simplified illustration of the specta of the RZ-OOK signal of 4a, in accordance with an embodiment of the present disclosure.
Figure 4C:
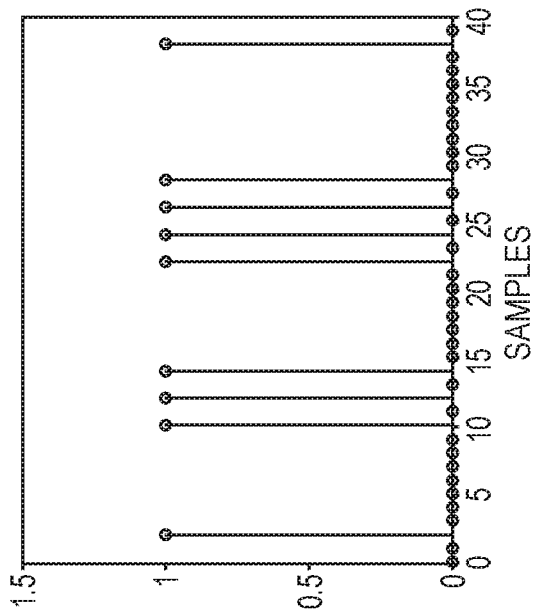
FIG. 4c is a simplified illustration of the non return-zero (NRZ)-OOK signal with binary OOK with no clock power at the symbol rate digitized at ×2 sampling ratio, in accordance with an embodiment of the present disclosure.
Figure 4D:
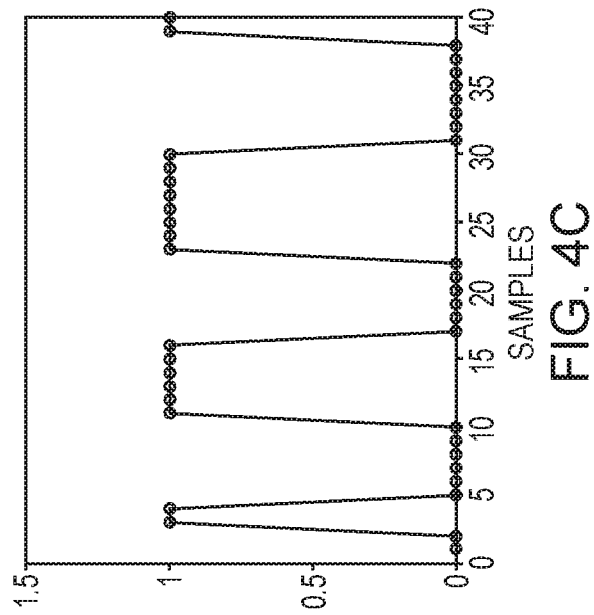
FIG. 4d is a simplified illustration of the frequency spectra of the NRZ-OOK signal of 4c, in accordance with an embodiment of the present disclosure.

In many embodiments, a RZ-OOK signal can be digitized at 2 samples per symbol. In most embodiments a RZ-OOK signal's discrete Fourier transform (DFT) may have a clock power at the symbol rate $1/T_s$. For example, refer to the example embodiments of FIGS. 4a, 4b, 4c, and 4d. FIG. 4a represents a RZ-OOK signal digitized at a ×2 sampling ratio. FIG. 4b, represents the specta of the RZ-OOK signal of 4a. FIG. 4c represents the non return-zero (NRZ)-OOK signal with binary OOK with no clock power at the symbol rate digitized at ×2 sampling ratio. FIG. 4d represents the frequency spectra of the NRZ-OOK signal of 4c.

Figure 5B:
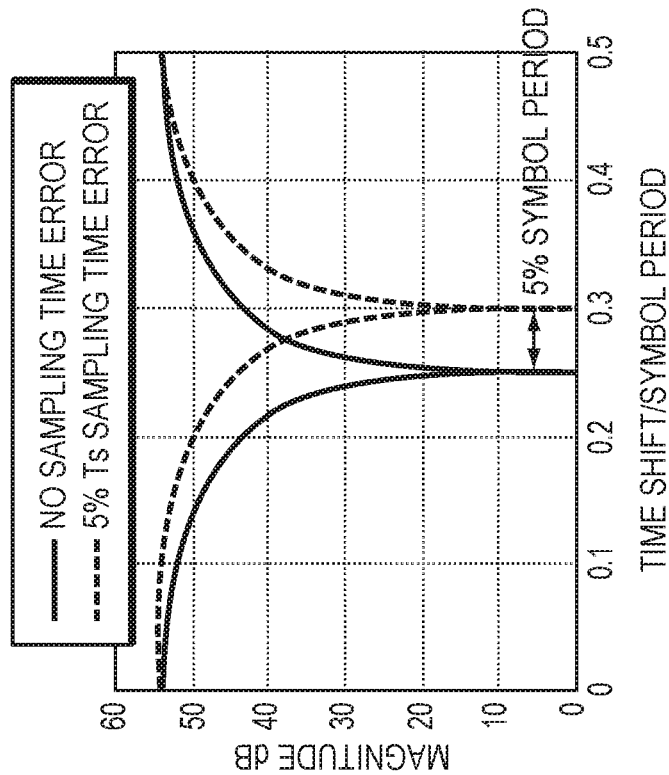
FIG. 5b is a simplified illustration of the clock power of the time shifted RZ signal sampled at 2 samples per symbol, in accordance with an embodiment of the present disclosure.
Figure 5A:
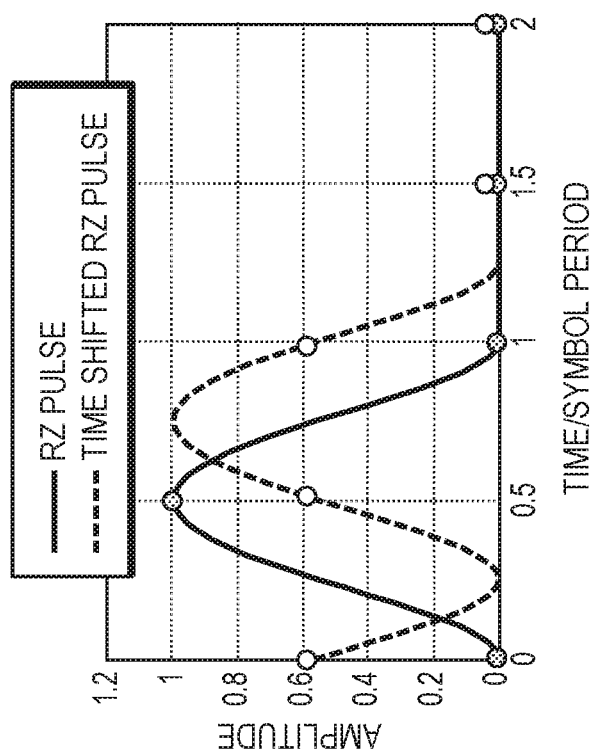
FIG. 5a is a simplified illustration of a digitized RZ signal shifted by ¼ of the symbol period $T_s$, in accordance with an embodiment of the present disclosure.

Refer now to the example embodiments of FIGS. 5a and 5b. In the example embodiment of FIG. 5a, the digitized RZ signal is shifted by ¼ of the symbol period $T_s$, which converts the digitized RZ signal into a digitized NRZ signal. In most embodiments, clock power at symbol rate may be a function of the time shift of the RZ signal. In many embodiments, if there is no sampling time error of the RZ pulse as shown in the FIG. 5a, then the clock power is minimized at the quarter of symbol period shift.

In some embodiments, a minimum clock power may be offset by the same amount of the sampling time error $$\text{time error} = \frac{1}{4}T_s - t$$

Where t is the time shift causes minimum clock power. In many embodiments, clock power offset may be used to estimate the different sampling time error of I/Q components. The example embodiment of FIG. 5b illustrates the clock power of the time shifted RZ signal sampled at 2 samples per symbol.

Figure 6A:
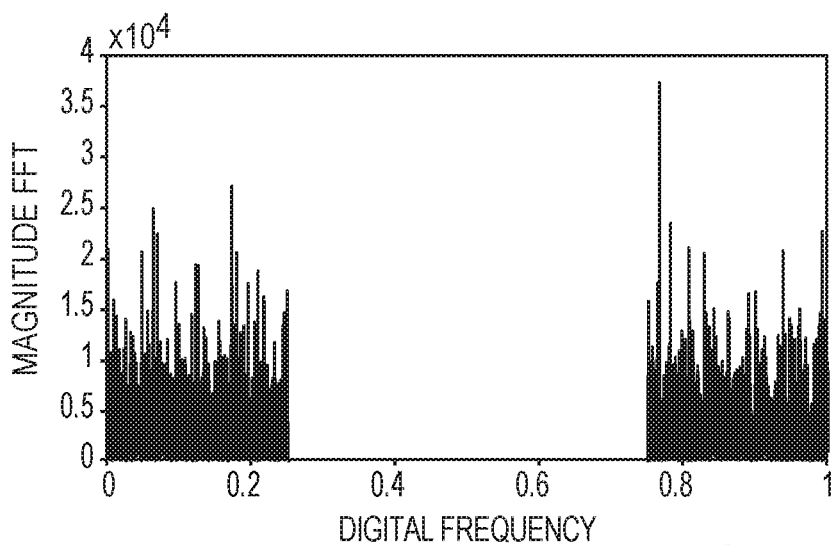
FIG. 6a is a simplified illustration of zero padding a discrete fourier transform, in accordance with an embodiment of the present disclosure.
Figure 6B:
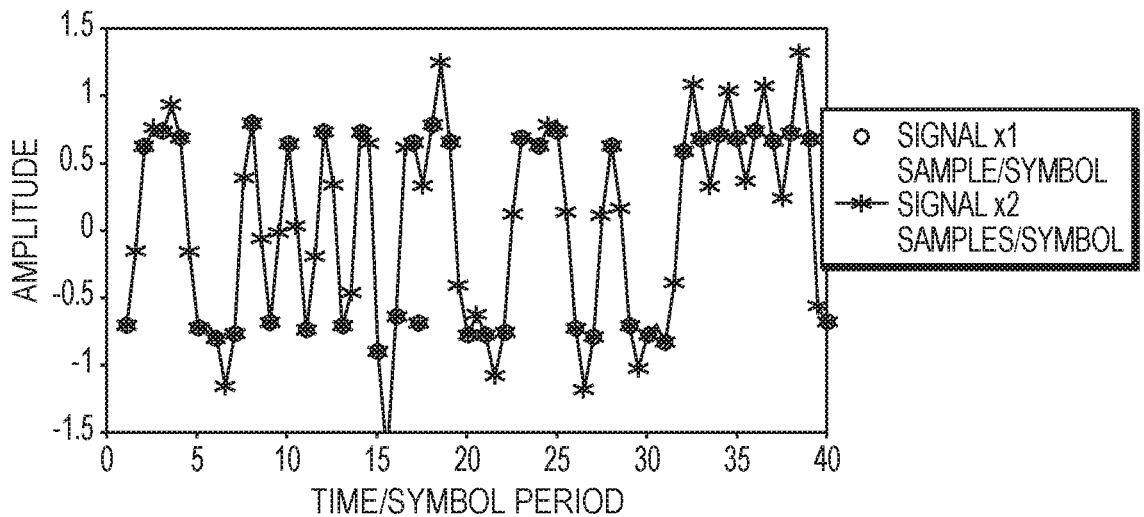
FIG. 6b is a simplified illustration of a resampled signal at 2 samples/symbol, in accordance with an embodiment of the present disclosure.
Figure 6C:
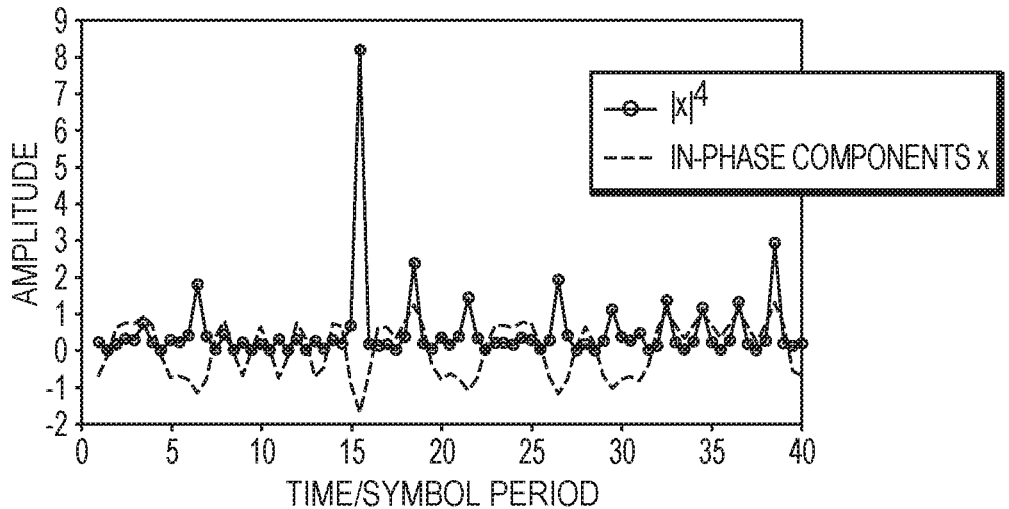
FIG. 6c is a simplified illustration of a RZ-OOK signal generated from FIG. 6c, in accordance with an embodiment of the present disclosure.

In many embodiments, a signal for processing may have one sample per symbol and may have bipolar values. In certain embodiments, for a QPSK signal, the I/Q components may be near 1 or −1. In other embodiments, for a 16QAM signal, the I/Q components may be near 3, 1, −1,−3. In some embodiments, in order to generate a "RZ" type OOK signal for both I/Q components at 2 samples per symbol, I/Q components may be resampled by zero-padding in the frequency domain and then implementing an inverse of a discrete Fourier transform to achieve ×2 samples/symbol rate. Refer now to the example embodiment of FIG. 6a, which illustrates zero padding a discrete fourier transform and FIG. 6b which illustrates a resampled signal at 2 samples/symbol. In many embodiments, taking a $4^{th}$ power of a resampled signal, such as that of FIG. 6b, may generate a RZ-OOK signal, such as the RZ-OOK signal from constellation data illustrated in the example embodiment of FIG. 6c.

In certain embodiments, a time shift of the waveform may be implemented in a frequency domain by applying a transfer function $$H(f)=\exp(-j2\pi ft)$$

Into the signal, where t is the time shift measured in seconds.

Figure 7A:
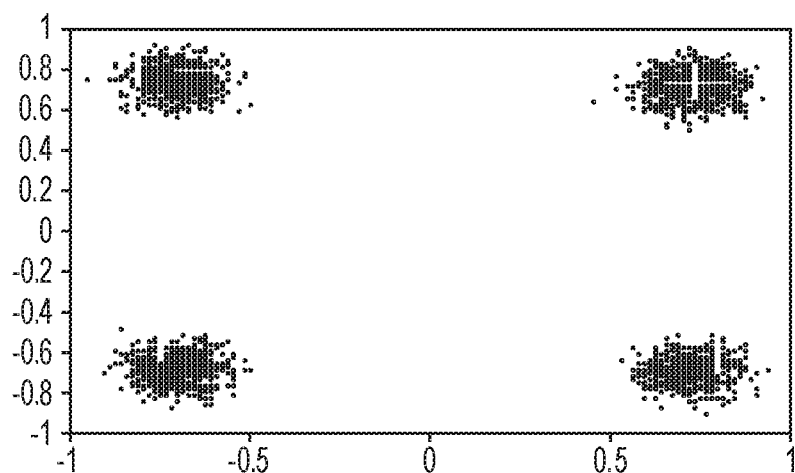
FIGS. 7a-7e are simplified illustrations of different signal constellations after moving the in-phase component of the signal by different amounts of time, in accordance with an embodiment of the present disclosure.
Figure 7B:
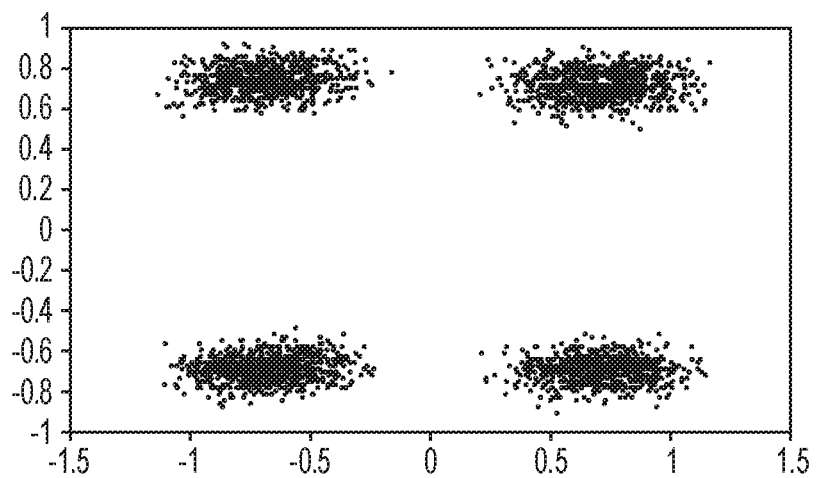
Figure 7C:
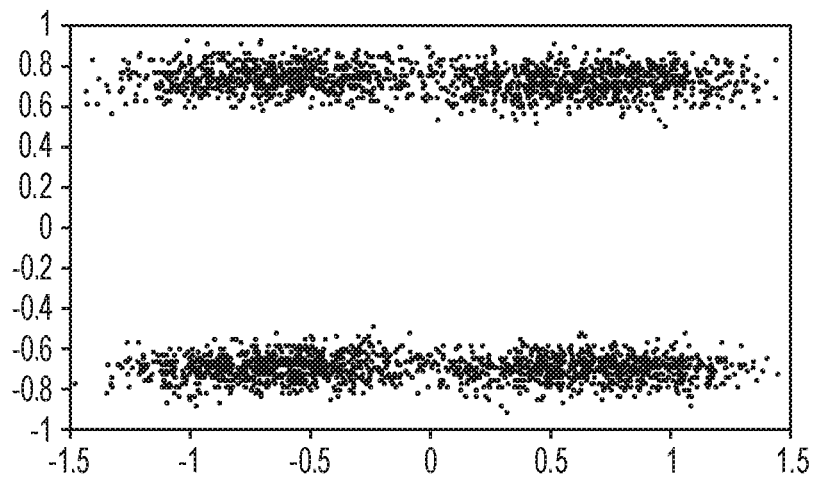
Figure 7D:
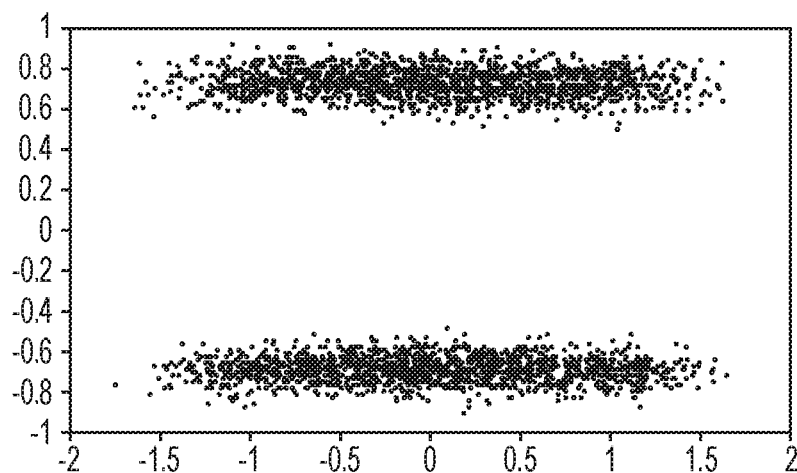
Figure 7E:
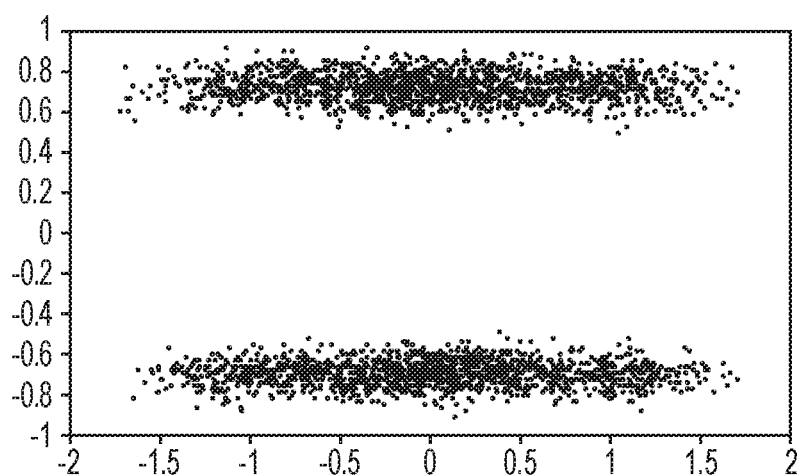
Figure 7F:
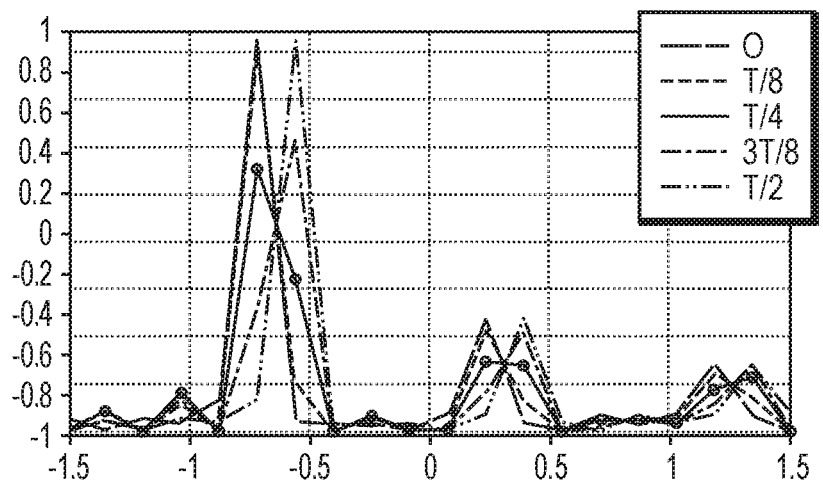
FIG. 7f is a simplified illustration of a RZ waveform of in-phase components at 2 samples per symbol, in accordance with an embodiment of the present disclosure.

Refer now to the example embodiments of Figures, 7a, 7b, 7c, 7d, 7e, and 7f. The example embodiments of FIGS. 7a-e illustrates different signal constellation after moving the in-phase component of the signal by different amounts of time. FIG. 7a, represents an original constellation with an in-phase time shift equal to 0. FIG. 7b, represents a constellation with an in-phase time shift equal to ⅛th symbol per period. FIG. 7c, represents a constellation with an in-phase time shift equal to ¼th symbol per period. FIG. 7d, represents a constellation with an in-phase time shift equal to ⅜th symbol per period. FIG. 7e, represents a constellation with an in-phase time shift equal to ½th symbol per period. In many embodiments, a constellation may become worse or more distorted as the in-phase component is moved by half of the symbol period. The example embodiment of FIG. 7f represents a RZ waveform of in-phase components at 2 samples per symbol.

Figure 8B:
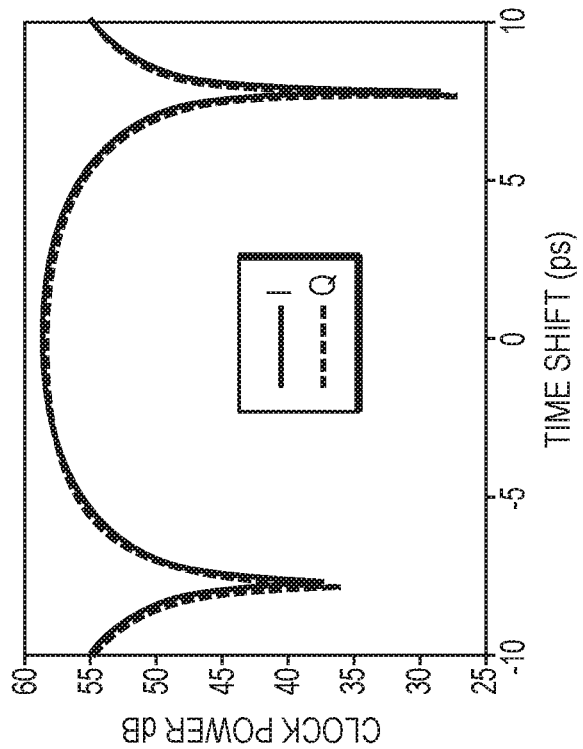
FIG. 8b is a simplified illustration of the clock power of the time shifted RZ signal sampled at 2 samples per symbol, in accordance with an embodiment of the present disclosure.
Figure 8A:
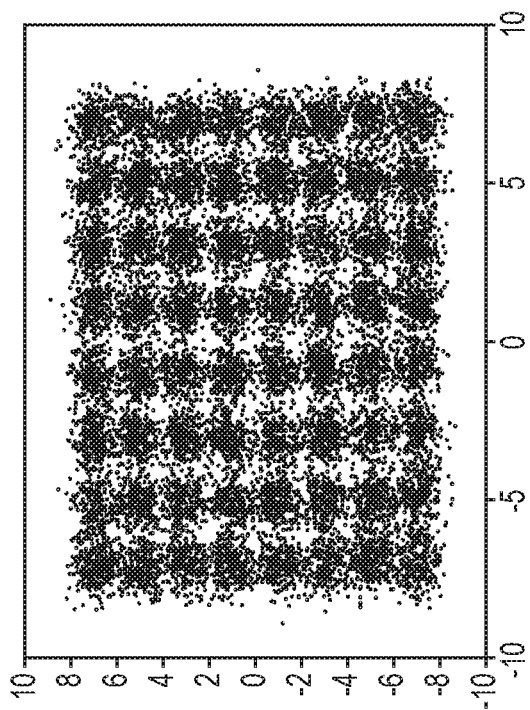
FIG. 8a is a simplified illustration of a digitized RZ signal shifted by ¼ of the symbol period $T_s$, in accordance with an embodiment of the present disclosure.

In these embodiments, the clock power at symbol rate is minimized by moving the in-phase component by a quarter of the symbol period. In some embodiments, clock power at symbol rate may be minimized as the energy of a RZ signal is separated equally into two time instances (half of symbol period time interval) and may become a NRZ signal. In some embodiments, moving the in phase component and quadrature component to compare the relative time shift may enable estimation of a minimum clock power at the symbol rate. In certain embodiments, the difference between two time shifts corresponding to the minimum clock power may be the estimated TX skew. In other embodiments, this method may also work for skew estimation for higher-order modulation format like 64 QAM. Refer now to the example embodiment of FIGS. 8a and 8b. FIGS. 8a and 8b, illustrating 64QAM constellation and clock power vs. time shift RZ type waveform, show that the fourth power of the resampled I/Q components has a minimum clock power at the quarter of the symbol period when there is no Tx skew.

Figure 9A:
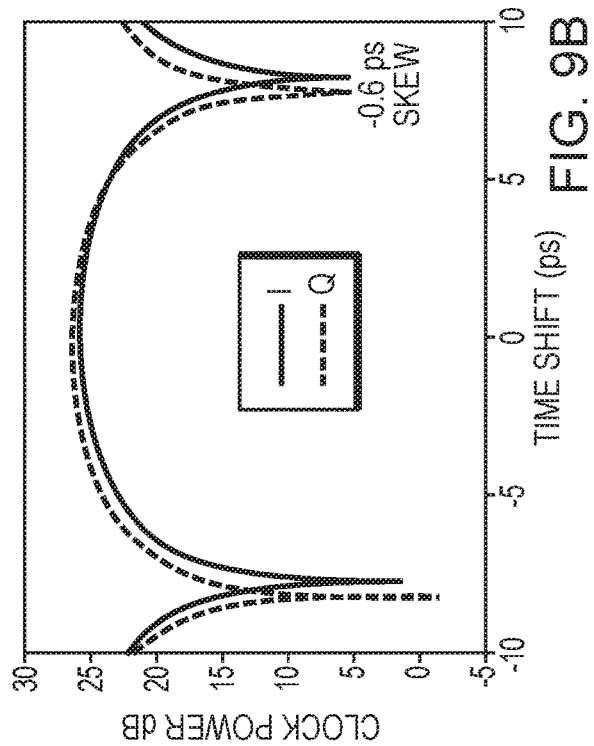
FIGS. 9a and 9b are simplified illustrations of estimating skew, in accordance with an embodiment of the present disclosure.
Figure 9B:
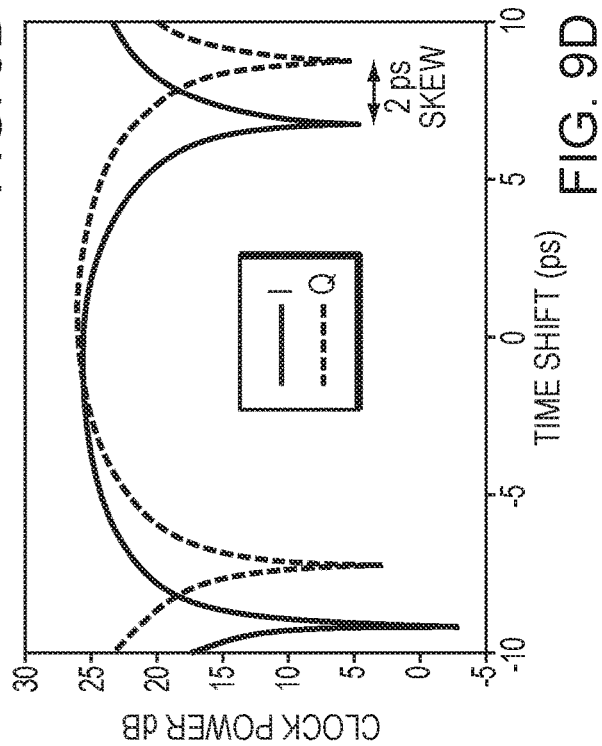
Figure 9C:
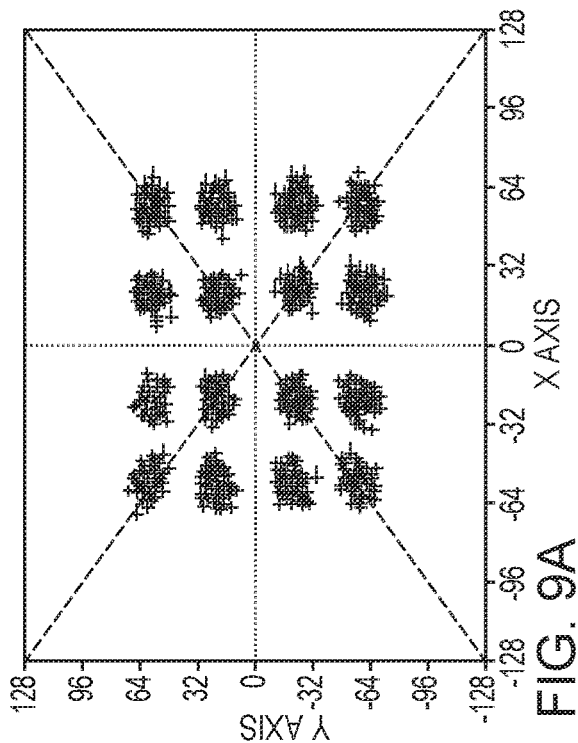
FIGS. 9c and 9d are simplified illustrations of an in-phase component and quadrature component time shifted by a digital filter, in accordance with an embodiment of the present disclosure.
Figure 9D:
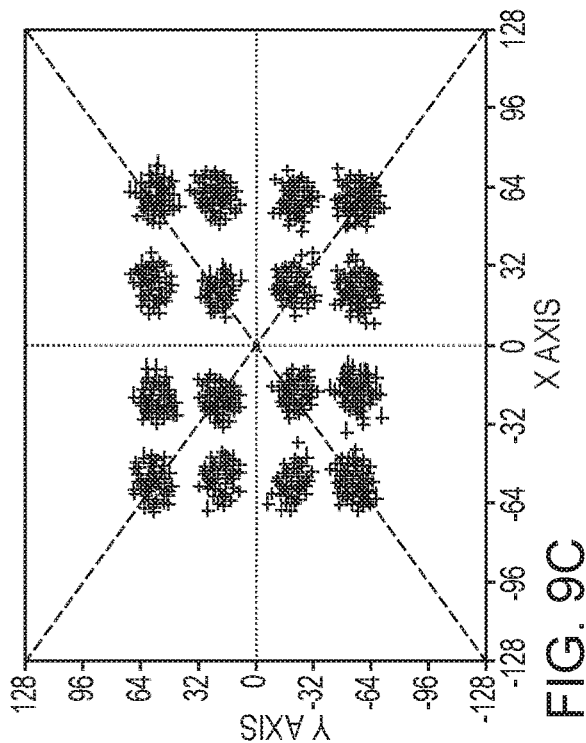

In certain embodiments, it is possible to verify the accuracy of skew estimation by introducing opposite skew values in a transmitter. In a particular embodiment, a 65-tap digital filter may be used to shift the waveforms of I/Q components. In this embodiment, a symbol rate of the transmitted 16QAM signal is about 31.38 Gbd, therefore the symbol period time is 31.87 ps. In this particular embodiment, if there is no sampling time error, then the minimum clock power is achieved at the time shift of a quarter of the symbol period, i.e., 8 ps. In this embodiment, a −0.7 ps time shift of in-phase component and 0.7 ps time shift of quadrature component is introduced. In this embodiment, the curve of clock power vs. time shift for in-phase component is at the right side of quadrature component. The measured skew is −0.6 ps. In this embodiment, an opposite skew for I/Q components and the relative location of curves are introduced. In this embodiment with the opposite skew, because there is a residual skew which is aligned with the second case, there is a larger estimate value of skew as 2 ps in the second case. Skew is illustrated in the example embodiments of FIGS. 9a and 9b, which show an example of estimating skew. FIGS. 9a and 9b show that the in-phase component has a −0.7 ps time shift and quadrature component has 0.7 ps time shift by digital filter. FIGS. 9c and 9d show that the in-phase component has a 0.7 s ps time shift and quadrature component has-0.7 ps time shift by a digital filter. In these example embodiments, the constellation in FIG. 9a is better than the constellation of FIG. 9c because of smaller skew (i.e −0.6 ps vs. 2.0 ps).

Figure 9F:
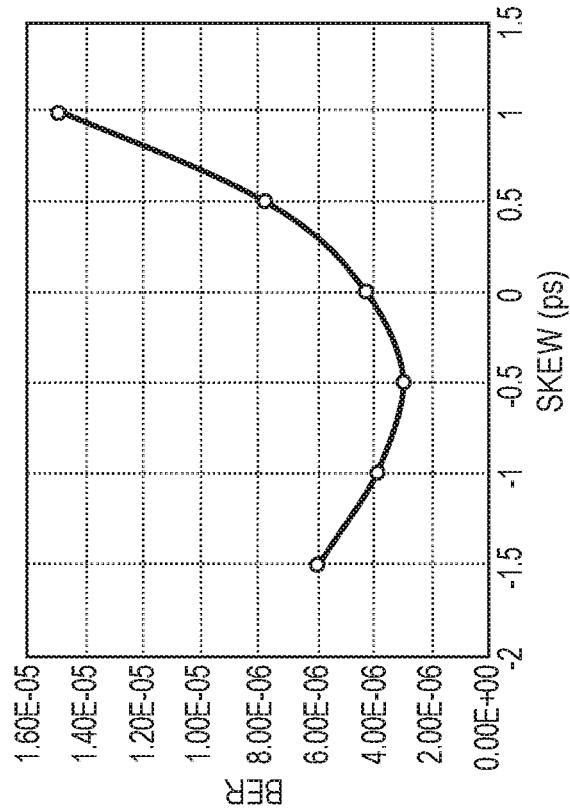
FIGS. 9e and 9f are simplified illustrations of measuring the intrinsic skew of a transmitter and BER performance verses compensated skew values such as those estimated in FIGS. 9a-9d, in accordance with an embodiment of the present disclosure.
Figure 9E:
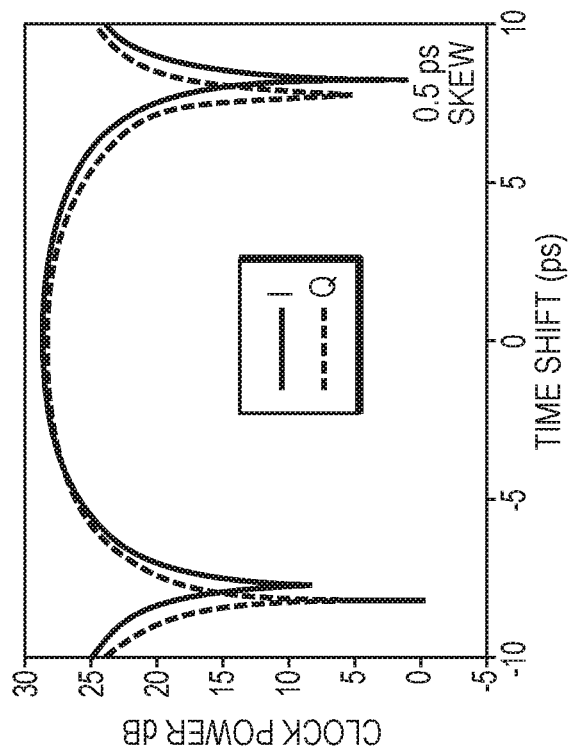

In further embodiments, accuracy of the skew measurement may be tested by verifying the estimated TX skew by measuring the BER performance. Refer, for example to the example embodiments of FIGS. 9e and f, which measure the intrinsic skew of a transmitter and BER performance verses compensated skew values such as those estimated in FIGS. 9a-9d. In FIG. 9e the 0.5 ps intrinsic value of skew of the transmitter is measured, followed by a measurement of the BER performance after applying different skew using a digital filter in the transmitter. In FIGS. 9e and 9f, the measured BER performance is optimal at −0.5 ps.

In certain embodiments, one or more of the current techniques may be useful in determining IQ skew in an optical system. In many embodiments, in an optical system, information may be encoded in a light wave. In almost all embodiments, if there is skew in I/Q of an optical signal then it may be problematic to recover information in the optical signal. In most embodiments, it may be beneficial to remove the skew in the I/Q of an optical system. In many embodiments, information encoded in an optical signal may be encoded from electrical information. In most embodiments, in an optical system, a set of operations may be performed before skew is estimated in the optical system.

Figure 10:
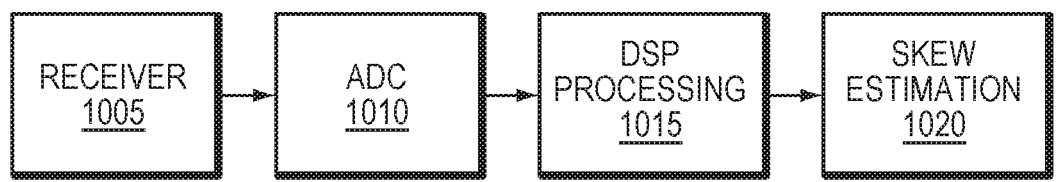
FIG. 10 is a simplified example of a method of Tx skew estimation, in accordance with an embodiment of the present disclosure.

Refer now to the example embodiment of FIG. 10, which represents a generalized example of Tx skew estimation. In the example embodiment of FIG. 10, Receiver 1005 sends a received analog signal to Analog to Digital Converter (ADC) 1010. ADC 1010 converts the received analog signal to a digital signal. ADC 101 sends the digital signal to Digital Signal Processing (DSP) Processing 1015. DSP 1015 performs digital signal processing to ready the signal for skew estimation. Skew is estimated in Skew Estimation 1020. In many embodiments, skew may be estimated according to one or more of the techniques discussed herein. In most embodiments, DSP Processing may include one or more of the following: frequency offset processing, quadrature error filtering, frequency offset processing, flexible up-sampling processing, multiple input multiple output adaptive linear equalization processing, and carrier phase recovery processing. In most embodiments, a resulting signal after carrier phase recovery without phase ambiguity can be used to estimate the Tx skew as described herein. In certain embodiment, the example embodiment of FIG. 10 may be used for estimating IQ skew in an RF system.

Figure 11:
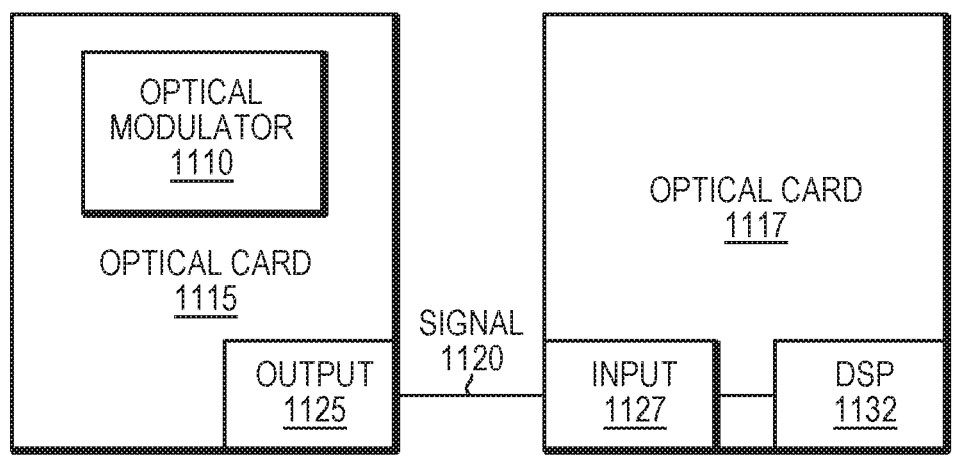
FIG. 11 is a simplified illustration of an optical system with two optical cards, in accordance with an embodiment of the present disclosure.

Refer now to the example embodiment of FIG. 11. In FIG. 11, optical modulator 1110 has been included on optical card 1115. Optical card 1115 outputs signal 1120 though output 1125. In the example embodiment of FIG. 11, optical card 1115 has electronics delay that adds skew to a signal outputted by optical modulator 1110 resulting in signal 1120 output from output 1125. Refer now as well to the example embodiment of FIG. 2a. Applying the method of FIG. 2a to signal 1120 it is possible to estimate the skew between the I and Q components of the IQ signal and correct the signal skew within optical card 1115 by either adjusting optical modulator 1110 or optical card 1115. Thus, optical skew may be eliminated in any signal outputted from optical card 1115. In certain embodiments, optical skew may be estimated by a DSP such as DSP 1132 located on optical card 1117. In some embodiments, a DSP, such as DSP 1132, may receive a signal from input 1127.

In a particular embodiment, an optical card, such as the optical cards of FIG. 11, may be tested in a production site with a short transmit receive loop to a receiver at the production site. In this particular embodiment, skew may be calculated at the receiver and transmitted back to the transmitter to have the skew corrected at the production site. In other embodiments, an optical card may be tested after being installed at greater distances apart, such as the normal operating distance of the cards. In some embodiments, normal operating distance of cards may be under a mile. In other embodiments, normal operating distance of cards may be miles. In further embodiments normal operating distances of the cards may be many hundreds of miles such as in submarine applications.

Figure 12:
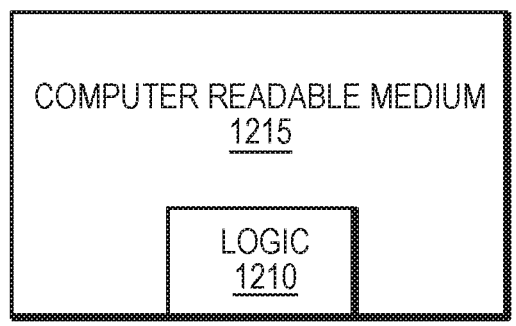
FIG. 12 is an example of an embodiment of a method embodied on a computer readable storage medium that may utilize the techniques described herein, in accordance with an embodiment of the present disclosure.

Refer now to the example embodiment of FIG. 12, which represents logic 1210 stored on a computer readable medium 1215. In many embodiments, a computer readable medium may include a CD-ROM, a hard disk, a floppy drive, a USB drive, a memory, or any medium readable by a computer.

In another other embodiment, an optical card may be tested when installed over a normal operating distance. In this other embodiment, a signal may be transmitted from a transmitter to a receiver and skew may be calculated at the receiver. In this other embodiment, information on the skew may be transmitted back to the transmitter so the skew may be fixed.

In many embodiments, one or more of the current techniques may be performed on a Digital Signal Processing (DSP) of a receiver. In certain embodiments, a DSP of a receiver may calculate skew from a transmitter. In most embodiments, one or more of the current techniques may be performed in real time. In most embodiments, estimated skew may be transmitted to the transmitter sending the signal upon which the skew was estimated and the transmitter may account for the estimated skew to enable the transmitter correct for the skew.

In some embodiments, one or more of the embodiments described herein may be stored on a computer readable medium. In certain embodiments, a computer readable medium may be one or more memories, one or more hard drives, one or more flash drives, one or more compact disk drives, or any other type of computer readable medium. In certain embodiments, one or more of the embodiments described herein may be embodied in a computer program product that may enable a processor to execute the embodiments. In many embodiments, one or more of the embodiments described herein may be executed on at least a portion of a processor. In most embodiments, a processor may be a physical or virtual processor. In other embodiments, a virtual processor may be spread across one or more portions of one or more physical processors. In certain embodiments, one or more of the embodiments described herein may be embodied in hardware such as a Digital Signal Processor DSP. In certain embodiments, one or more of the embodiments herein may be executed on a DSP. One or more of the embodiments herein may be programed into a DSP. In some embodiments, a DSP may have one or more processors and one or more memories. In certain embodiments, a DSP may have one or more computer readable storages. In other embodiments, one or more of the embodiments stored on a computer readable medium may be loaded into a processor and executed.

The invention claimed is:

1. A method for estimating transmitter skew comprising:
   restoring an In-phase (I) component and a Quadrature-phase (Q) component of a signal;
   determining skew inserted at a transmitter portion of a transceiver (transmitter skew) at a receiver portion of a second transceiver between the I component and the Q component using extracted clock information from the restored I component and extracted clock information from the restored Q component; and
   time shifting at least one component of the signal.

2. The method of claim 1 further comprising:
   performing carrier phase recovery on the signal;
   time shifting the I component;
   determining a fourth power of the time shifted I component after the performing carrier phase recovery;
   time shifting the Q component; and
   determining a fourth power of the time shifted Q component after the performing carrier phase recovery.

3. The method of claim 1 wherein the signal is received at a receiver and corresponds to a signal transmitted by a transmitter; wherein the transmitter skew corresponds to a relative clock delay between the I component and the Q component.

4. The method of claim 2 further comprising:
   extracting the I component and Q component of the signal using absolute phase detecting using pilot symbols; wherein the extracted clock information from the I component and the extracted clock information from the Q component is generated after the performing carrier phase recovery.

5. The method of claim 3 further comprising:
   extracting the I and Q components of the signal from the transmitter at the receiver after carrier phase recovery by using absolute phase detection, where the absolute phase detection uses pilot symbols to remove ambiguity.

6. The method of claim 2 further comprising:
   estimating a time difference between the restored I and Q components to cause a clock power of a non-linear operation of the I and Q components to be minimized.

7. A computer program product comprising:
   a non-transitory computer readable medium containing logic enabling execution of:
   restoring an In-phase (I) component and a quadrature-phase (Q) component of a signal;
   determining skew inserted at a transmitter (transmitter skew) at a receiver between the I component and the Q component using extracted clock information from the restored I component and extracted clock information from the restored Q component; and
   time shifting at least one component of the signal.

8. The computer program product of claim 7, wherein the logic further enables:
   extracting clock information from the I component; and
   extracting clock information from the Q component.

9. The computer program product of claim 7 further enabling execution of:
   performing carrier phase recovery on the signal;
   time shifting the I component;
   determining a fourth power of the time shifted I component after the performing carrier phase recovery;

time shifting the Q component; and
determining a fourth power of the time shifted Q component after the performing carrier phase recovery.

10. The computer program product of claim 7 wherein the signal is received at a receiver and corresponds to a signal transmitted by a transmitter; wherein the transmitter skew corresponds to a relative clock delay between the I component and the Q component.

11. The computer program product of claim 8 further enabling execution of:
performing carrier phase recovery; and
extracting the I component and Q component of the signal using absolute phase detecting using pilot symbols; wherein extracting of the extracted clock information from the I component and the extracted clock information from the Q component is generated after performing carrier phase recovery on the signal.

12. The computer program product of claim 9 further enabling execution of:
extracting the I and Q components of the signal from a transmitter at a receiver after the performing carrier phase recovery by using absolute phase detection, where the absolute phase detection uses pilot symbols to remove ambiguity.

13. The computer program product of claim 10 further enabling execution of:
estimating a time difference between the restored I and Q components to cause a clock power of a non-linear operation of the I and Q components to be minimized.

14. A system for estimating transmitter skew, the system comprising:
a receiver having a digital signal processor (DSP); and
logic executable by the DSP; wherein the logic enabling the DSP to perform:
restoring an In-phase (I) component and a quadrature-phase (Q) component of a signal;
determining skew inserted at a transmitter (transmitter skew) at a receiver between the I component and the Q component using extracted clock information from the restored I component and extracted clock information from the restored Q component; and
time shifting at least one component of the signal.

15. The system of claim 14 wherein the logic further enables the DSP to perform:
performing carrier phase recovery on the signal;
time shifting the I component;
determining a fourth power of the time shifted I component after the performing carrier phase recovery;
time shifting the Q component; and
determining a fourth power of the time shifted Q component after the performing carrier phase recovery.

16. The system of claim 14 wherein the signal is received at the receiver and corresponds to a signal transmitted by a transmitter; wherein the transmitter skew corresponds to a relative clock delay between the I component and the Q component.

17. The system of claim 15 wherein the logic further enables the DSP to perform:
performing carrier phase recovery; and
extracting the I component and Q component of the signal using absolute phase detecting using pilot symbols; wherein the extracted clock information from the I component and the extracted clock information from the Q component is generated after the performing carrier phase recovery.

18. The system of claim 15 wherein the logic further enables the DSP to perform:
estimating a time difference between the time shifted I component and the time shifted Q component to remove differences of clock power of a nonlinear operation of the I component of the signal and of clock power of a nonlinear operation of the Q component of the signal.

19. The system of claim 17 wherein the logic further enables the DSP to perform:
extracting the I and Q components of the signal from a transmitter at a receiver after the performing carrier phase recovery by using absolute phase detection, where the absolute phase detection uses pilot symbols to remove ambiguity.

* * * * *